United States Patent
Ryou et al.

(10) Patent No.: US 8,728,681 B2
(45) Date of Patent: May 20, 2014

(54) INORGANIC CONDUCTIVE MEMBRANE, FUEL CELL CONTAINING THE SAME, AND METHOD FOR MANUFACTURING THEREOF

(75) Inventors: Byung Hoon Ryou, Seoul (KR); Jae Kyung Kong, Seoul (KR)

(73) Assignee: E.M.W. Energy Co., Ltd., Seoul (KR)

( * ) Notice: Subject to any disclaimer, the term of this patent is extended or adjusted under 35 U.S.C. 154(b) by 240 days.

(21) Appl. No.: 12/990,218

(22) PCT Filed: Apr. 27, 2009

(86) PCT No.: PCT/KR2009/002183
§ 371 (c)(1),
(2), (4) Date: Oct. 28, 2010

(87) PCT Pub. No.: WO2009/134039
PCT Pub. Date: Nov. 5, 2009

(65) Prior Publication Data
US 2011/0045379 A1  Feb. 24, 2011

(30) Foreign Application Priority Data
Apr. 29, 2008 (KR) .................. 10-2008-0039757

(51) Int. Cl.
*H01M 8/10* (2006.01)
(52) U.S. Cl.
USPC ........................ 429/500; 429/479; 429/535
(58) Field of Classification Search
USPC ................... 429/479, 500, 535; 205/730
See application file for complete search history.

(56) References Cited

U.S. PATENT DOCUMENTS

| | | | |
|---|---|---|---|
| 5,693,210 A | 12/1997 | Tomita et al. | |
| 2005/0112435 A1* | 5/2005 | Kobayashi et al. | 429/30 |

FOREIGN PATENT DOCUMENTS

| | | |
|---|---|---|
| CN | 001990101 A | 7/2007 |
| EP | 1357626 A1 | 10/2003 |

(Continued)

OTHER PUBLICATIONS

Im, Wan Sun et al., "Fabrication of Alumina Membrane Using Anodic Oxidation Process", Korean Journal of Materials Research, vol. 13, No. 9 (Sep. 3, 2003).

(Continued)

*Primary Examiner* — Ula C Ruddock
*Assistant Examiner* — Frank Chernow
(74) *Attorney, Agent, or Firm* — The PL Law Group, PLLC

(57) ABSTRACT

The present invention relates to an inorganic ion conductive membrane, which is capable of obtaining a fuel cell with a stable operation in all temperature, high performance, and no leakage of fuels by manufacturing the inorganic ion conductive membrane, composed of an inorganic membrane, using an anodic oxidization reaction and applying the manufactured inorganic ion conductive membrane to the fuel cell, a fuel cell including the inorganic ion conductive membrane, and a method of manufacturing the inorganic ion conductive membrane and the fuel cell. The method of manufacturing the inorganic ion conductive membrane includes the steps of (a) disposing a conductive wire, made of the same materials as a metal tube, within the metal tube, supplying an anode current to the conductive wire, and supplying a cathode current to the metal tube and (b) applying an electrolyte to the metal tube and the conductive wire, thereby forming an inorganic membrane comprising a plurality of pores in at least some of an inside wall and outside wall of the metal tube to which the cathode current has been supplied.

5 Claims, 1 Drawing Sheet

(56) References Cited

FOREIGN PATENT DOCUMENTS

| EP | 1900418 A1 | 3/2008 | |
|---|---|---|---|
| IT | EP 1391235 * | 2/2004 | ............ B01D 71/02 |
| JP | 09-249992 A | 11/1997 | |
| JP | 2003-317741 A | 11/2003 | |
| JP | 2004-047206 A | 2/2004 | |
| JP | 2005-003466 A | 1/2005 | |
| JP | 2005-226087 A | 8/2005 | |
| JP | 2006-026938 A | 2/2006 | |
| JP | 2007-087826 A | 4/2007 | |
| JP | 2007-090241 A | 4/2007 | |
| JP | 2008-150644 A | 7/2008 | |
| JP | 2009-083432 A | 4/2009 | |
| KR | 1020100013306 A | 2/2010 | |
| WO | 2005092794 A1 | 10/2005 | |

OTHER PUBLICATIONS

International Search Report (Application No. PCT/KR2009/002183).
English Translation of Abstract of JP 2007-087826.
English Translation of Abstract of JP 2005-226087.
English Translation of Abstract of JP 2003-317741.
The Office action dated Mar. 18, 2011, issued by Korea Intellectual Property Office, in a counterpart Korean patent application KR10-2009-7008582.
The Office action dated Nov. 30, 2011, issued by Korea Intellectual Property Office, in a counterpart Korean patent application KR10-2009-7008582.
W.S. Im et al., Fabrication of Alumina Membrane Using Anodic Oxidation Process, Korean Journal of Materials, Research, vol. 13, No. 9 (2003) (cited in the Office actions issued by Korea Intellectual Property Office in a counterpart Korean patent application KR10-2009-7008582).
The Office action dated May 22, 2012, issued by Japanese Patent Office, in a counterpart Japanese patent application JP2011-507340.
The Office action dated Dec. 3, 2012, issued by Chinese Patent Office, in a counterpart Chinese patent application CN20098115280.
N. Itoh et al., Strengthened porous alumina membrane tube prepared by means of internal anodic oxidation, Microporous and Mesoporous Materials, 20 (1998) 333-337 (cited in the Office actions issued by Chinese Patent Office in a counterpart Chinese patent application).
Wen C. Say et al., Formation of Tin Whiskers and Spheres on Anodic Aluminum Oxide Template, Japanese Journal of Applied Physics, vol. 46, No. 11, 2007, pp. 7577-7580 (cited in the Office actions issued by Chinese Patent Office in a counterpart Chinese patent application).
European Search Report dated Dec. 17, 2013, issued by European Patent Office, in a counterpart European patent application.
D Djozan: "Anodizing of inner surface of 6-8 long and small-bore aluminum tube", Surface and Coatings Technology, vol. 173, No. 2-3, Aug. 22, 2003, pp. 185-191.
N. Itoh et al., "Preparation of a tubular 6-8 anodic aluminum oxide membrane", Journal of Membrane Science, Elsevier Scientific Publ. Company. Amsterdam, NL, vol. 117, No. 1, Aug. 21, 1996, pp. 189-196).

* cited by examiner

INORGANIC CONDUCTIVE MEMBRANE, FUEL CELL CONTAINING THE SAME, AND METHOD FOR MANUFACTURING THEREOF

CROSS-REFERENCES TO RELATED APPLICATION

The present application claims priority to International Application PCT/KR2009/002183, with an International Filing Date of Apr. 27, 2009, which claims the benefit of Korean patent application No. 10-2008-0039757 filed in the Korea Intellectual Property Office on Apr. 29, 2008, the entire contents of which are incorporated herein by reference.

BACKGROUND OF THE INVENTION

1. Field of the Invention

The present invention relates to an inorganic ion conductive membrane, a fuel cell including the inorganic ion conductive membrane, and a method of manufacturing the same and, more particularly, to an inorganic ion conductive membrane, which is capable of obtaining a fuel cell with a stable operation in all temperature, high performance, and no leakage of fuels by manufacturing the inorganic ion conductive membrane, composed of an inorganic membrane, using an anodic oxidization reaction and applying the manufactured inorganic ion conductive membrane to the fuel cell, a fuel cell including the inorganic ion conductive membrane, and a method of manufacturing the inorganic ion conductive membrane and the fuel cell.

2. Background of the Related Art

A fuel cell is an apparatus which uses current, generated when hydrogen ions and oxygen react with each other, as a fuel. More particularly, when a fuel, such as hydrogen or hydrocarbon, is applied to one side on the basis of an ion conductive membrane and oxygen or air is applied to the other side on the basis of the ion conductive membrane, hydrogen is dissociated by a catalyst on the fuel side and divided into positrons and electrons. The dissociated positrons react with oxygen through the ion conductive membrane, thereby generating water. The generated electrons are used as power.

Fuel cells can be classified into various fuel cells according to the fuel and structure used, an operation method, and so on. From among them, in the case of a hydrogen fuel cell and a methanol fuel cell, an ion conductive membrane of polymer materials is used as the ion conductive membrane.

A typical one of the ion conductive membrane made of polymer materials is a sulfonated tetrafluoro ethylene series polymer membrane (brand name: Nafion by DuPont). Nafion has a structure in which a perfluoro vinyl ethyl group ended with a sulfonic group is attached to a polymer backbone composed of sulfonated tetrafluoro ethylene. According to analyses of a cluster-network model from among various structure models, the ion cluster of a reversed micelle structure is consecutively disposed within a fluoro carbon lattice and formed between the micelles. Accordingly, an ion channel is formed through pores each having a diameter of approximately $10 \times 10^{-10}$ μm.

Accordingly, a pore containing an end having a similar positron conduction function can be used as the ion conductive membrane of a fuel cell. The ion conductive membrane of polymer materials has the following problems.

In case where the ion conductive membrane of polymer materials is used as an ion conductive membrane, temperature of the membrane changes according to a change in the driving temperature of a fuel cell. The diameter of an ion channel formed in the ion conductive membrane is also changed because of the characteristic of polymer having a molecular bond distance varying when temperature changes. If this phenomenon is generated, a crossover phenomenon occurs in which, when the fuel cell is operated, not only hydrogen ions, but fuels such as hydrogen or hydrocarbon invade the membrane. In the end, polarization is generated between the anode and the cathode within the fuel cell. Accordingly, there is a problem in that the performance of the fuel cell is rapidly decreased.

Furthermore, the ion conductive membrane used in the fuel cell must be strong against to mechanical shock, such as a change in the pressure, in view of its characteristic. The ion conductive membrane of polymer materials, however, is problematic in that, if used for a long time, the performance is deteriorated because it is sensitive to such physical impact.

Meanwhile, the ion conductive membrane of polymer materials physically has a direct contact with chemical materials. In view of the characteristic of polymer, such contact generates an undesirable chemical reaction. Consequently, there is a possibility that materials constituting the ion conductive membrane can be deteriorated.

Furthermore, the fuel cell must be operated in a very limited range of operating temperature in order not to damage polymer materials. Accordingly, there is a problem in that various advantages obtainable when the fuel cell is operated at high temperature have to be given up.

Accordingly, there is an urgent need for the development of an ion conductive membrane, which is capable of solving problems generated when the polymer materials are used, as an ion conductive membrane for use in a fuel cell.

SUMMARY OF THE INVENTION

Accordingly, the present invention has been made in view of the above problems occurring in the prior art, and it is an object of the present invention to provide a fuel cell which can be operated even at high temperature without the restriction of temperature, obtain various advantages obtainable at high temperature, and maximize the performance of a fuel cell by using not polymer materials, but inorganic materials as the ion conductive membrane of the fuel cell.

Furthermore, another object of the present invention is to obtain a stabilized fuel cell without the leakage of fuels, etc. even though temperature changes by using inorganic materials as the ion conductive membrane of the fuel cell.

Meanwhile, yet another object of the present invention is to provide a fuel cell which is capable of solving the problem of the existing fuel cell (that is, low reliability according to the existence of elasticity) and strong against physical impact and has a high activity by constructing the ion conductive membrane of a fuel cell using an inorganic ion conductive membrane without elasticity.

To achieve the above objects, according to an embodiment of the present invention, there is provided a method of manufacturing an inorganic ion conductive membrane, including the steps of (a) disposing a conductive wire, made of the same materials as a metal tube, within the metal tube, supplying an anode current to the conductive wire, and supplying a cathode current to the metal tube and (b) applying an electrolyte to the metal tube and the conductive wire, thereby forming an inorganic membrane comprising a plurality of pores in at least some of the inside wall and outside wall of the metal tube to which the cathode current has been supplied.

Furthermore, according to another embodiment of the present invention, there is provided a method of manufacturing an inorganic ion conductive membrane, including the steps of (a) disposing a conductive wire, made of the same materials as a metal plate, at a location spaced apart from the metal plate at a predetermined distance, supplying an anode current to the conductive wire, and supplying a cathode current to the metal plate and (b) applying an electrolyte to the metal plate and the conductive wire, thereby forming an inorganic membrane comprising a plurality of pores in at least one side of the metal plate to which the cathode current has been supplied.

The method can further include the step of removing at least some of the metal tube or the metal plate, remaining intact after forming the inorganic membrane, by using an etching method, after the step (b).

The method can further include the step of removing oxides existing in the metal tube or the metal plate by etching the metal tube or the metal plate using a basic solution and of removing insoluble materials existing in the metal tube or the metal plate by desmutting the metal tube or the metal plate using a mildly acid solution, before the step (a).

The acid electrolyte can be a sulfuric acid solution.

Meanwhile, according to yet another embodiment of the present invention, an inorganic ion conductive membrane including a plurality of pores is provided as an inorganic membrane.

The pore can have a diameter of 10 nm to 150 μm.

The thickness of the inorganic membrane can be 0.1 to 500 μm.

Meanwhile, according to still yet another embodiment of the present invention, there is provided a method of manufacturing the fuel cell, including the steps of (a) disposing a conductive wire, made of the same materials as a metal tube, within the metal tube, supplying an anode current to the conductive wire, and supplying a cathode current to the metal tube, (b) applying an electrolyte to the metal tube and the conductive wire, thereby forming an inorganic membrane comprising a plurality of pores in at least some of an inside wall and outside wall of the metal tube to which the cathode current has been supplied and thereby forming an inorganic ion conductive membrane, (c) removing at least some of the metal tube, remaining intact after forming the inorganic membrane, by using an etching method, and (d) dipping the inside wall and outside wall of the inorganic membrane in a noble metal series catalyst mother liquid, thereby forming a catalyst layer.

Furthermore, according to still yet another embodiment of the present invention, there is provided a method of manufacturing the fuel cell, including the steps of (a) disposing a conductive wire, made of the same materials as a metal plate, at a location spaced apart from the metal plate at a predetermined distance, supplying an anode current to the conductive wire, and supplying a cathode current to the metal plate, (b) applying an electrolyte to the metal plate and the conductive wire, thereby forming an inorganic membrane comprising a plurality of pores in at least one side of the metal plate to which the cathode current has been supplied and thereby forming an inorganic ion conductive membrane, (c) removing at least some of the metal plate, remaining intact after forming the inorganic membrane, by using an etching method, and (d) dipping both sides of the inorganic membrane in a metal series catalyst mother liquid, thereby forming a catalyst layer.

The method of manufacturing a fuel cell can further include the step of (e) settling a sulfonic group, enabling the conduction of hydrogen ions, in the pores of the inorganic membrane by having an organic solution, including a sulfonic group, come in contact with the catalyst layer.

The method can further include the step of exposing the inside or one side of the inorganic membrane to hydrogen or hydrocarbon and exposing the outside or the other surface of the inorganic membrane to air or oxygen, after the step (e).

The step (d) can include the step of dipping the inside wall of the inorganic membrane in a mixture catalyst solution of platinum and ruthenium and dipping the outside wall of the inorganic membrane in a platinum solution.

The step (d) can include the step of dipping one of both sides of the inorganic membrane in a mixture catalyst solution of platinum and ruthenium and dipping the other side of the inorganic membrane in a platinum solution.

Meanwhile, according to still yet another embodiment of the present invention, there is provided a fuel cell comprising an inorganic ion conductive membrane, comprising a plurality of pores, as an inorganic membrane.

The fuel cell can further include a catalyst layer formed on both sides of the inorganic ion conductive membrane and configured to have an activity for a hydrogen dissociation reaction.

DETAILED DESCRIPTION OF EMBODIMENTS

Figure 1:
FIGS. 1 and 2 are process diagrams illustrating a process of manufacturing an inorganic ion conductive membrane according to an embodiment of the present invention.

The present invention is described in detail with reference to the accompanying drawings in connection with specific embodiments in which the present invention can be implemented. The embodiments are described in detail in order for those having ordinary skill in the art to practice the present invention. It is to be understood that the various embodiments of the present invention differ from each other, but need not to be mutually exclusive. For example, a specific shape, structure, and characteristic described herein in relation to an embodiment can be implemented in another embodiment without departing from the spirit and scope of the present invention. It should be noted that the position or arrangement of each element within each disclosed embodiment can be modified without departing from the spirit and scope of the present invention. Accordingly, the following detailed description should not be construed as limiting the present invention. The scope of the present invention, if properly described, is limited by only the appended claims and equivalent thereof. The same reference numbers are used throughout the drawings to refer to the same parts.

Hereinafter, preferred embodiments of the present invention are described with reference to the accompanying drawings in order for those skilled in the art to be able to readily practice them.

Before describing the embodiments of the present invention, anodic oxidization necessary to describe the present invention is simply described.

Anodic Oxidization

Anodic oxidization refers to an oxidization phenomenon occurring when a cathode reaction is generated. If the anodic oxidization is employed, a process of growing an oxide or nitride membrane formed on a metal surface through an electrolytic reaction can be performed.

When the anodic oxidization is generated, a microscopic change in the shape of the metal surface or a change in the crystal structure can be generated. An example of the anodic oxidization is described below.

When DC current flows through an acid electrolyte, hydrogen is generated in an anode metal and oxygen is formed in a cathode metal (metals, such as aluminum (Al) alloy, titanium (Ti), zinc (Zn), magnesium (Mg), and niobium (Nb)). The formed oxygen reacts with the cathode metal to form a metal oxide membrane. In this process, the acid electrolyte finely dissolves the formed oxide membrane. Here, when the velocity of dissolution and the speed of the formed oxide membrane are balanced, uniform pores each having a diameter of 10 to 150 nm are formed on a surface of the cathode metal.

When the pores are formed, the acid electrolyte and the current can come in contact with a metal base existing on the lower part of the oxide membrane. Consequently, a very thicker membrane than an oxide membrane formed by an oxidization reaction of a voluntary metal can be formed.

The membrane through the above process has various physical properties according to its process conditions. If an electrolyte of a lower concentration and a higher current or voltage are used, a thick membrane is formed.

The formed oxide membrane has a thickness ranging from 0.5 to 150 μm. Meanwhile, the oxide membrane can be used for various purposes because it has high anti-corrosion property and anti-friction property and has regular fine pores formed in its surface so that solutions, such as dyes, can permeate the membrane.

The most widely known anodic oxidization process standard is a MIL-A-8625 standard. In accordance with the standard, an anodic oxidization process is classified into three kinds of aluminum anodic oxidization processes. The three kinds of processes include an anodic oxidization process, a sulphuric acid anodic oxidization process, and a sulphuric acid hard anodic oxidization process. Membranes formed by the three processes have different physical and chemical characteristics.

Inorganic Ion Conductive Membrane

Hereinafter, an inorganic ion conductive membrane for a fuel cell, manufactured by using the above-described anodic oxidization process, as an ion conductive membrane according to an embodiment of the present invention is described.

Figure 2:

First, a process of manufacturing the inorganic ion conductive membrane according to an embodiment of the present invention is described with reference to FIGS. 1 and 2.

The inorganic ion conductive membrane according to the present invention is manufactured by using a conductive metal. The conductive metal can be used as basic materials of the inorganic ion conductive membrane according to the present invention. It is hereinafter assumed that the conductive metal is, for example, aluminum, for convenience of description.

First, an aluminum tube 110 having an empty inside and a cylindrical shape is prepared. The inside and outside of the prepared aluminum tube are degreased. A common method can be used as the degreasing method. For example, a degreasing method using an acid solution can be used.

Next, metal oxides included in aluminum are removed by etching the degreased aluminum tube 110. To this end, a basic etching method of exposing the aluminum tube 110 to a basic solution can be used as the etching. Meanwhile, insoluble materials are also removed by desmutting the aluminum tube 110 using a mildly acid solution.

After the aluminum tube 110 from which oxides, insoluble materials, etc. have been removed is obtained as described above, an aluminum wire 130 or an aluminum iron wiring is disposed at the center of the aluminum tube 110 and an anode current is supplied to the aluminum wire, and a cathode current is supplied to the aluminum tube 110 so that the above-described anodic oxidization reaction can be generated.

Although aluminum is illustrated to have the form of the tube 110 and the aluminum wire 130 having the anode current supplied thereto is illustrated to be disposed within the tube, the present invention is not limited thereto. For example, aluminum can have a plate shape. That is, the cathode current may be applied to the aluminum plate, and the anode current may be applied to the aluminum wire spaced apart from the aluminum plate at a predetermined distance.

For the anodic oxidization reaction, an acid electrolyte is circulated within the aluminum tube 110. It is preferred that a sulfuric acid solution of low temperature be used as the acid electrolyte.

When the acid electrolyte is circulated as described above, hydrogen is generated around the aluminum wire 130 to which the anode current has been supplied, and oxygen is generated in the aluminum tube 110 to which the cathode current has been supplied. Oxygen reacts with the aluminum tube 110, and thus alumina (that is, oxidization aluminum) is slowly accumulated on the inside wall of the aluminum tube. The accumulated alumina is formed as an alumina membrane.

Here, as in the above-described anodic oxidization principle, the acid electrolyte finely dissolves the alumina membrane. When the velocity of dissolution and the growth speed of the alumina membrane are balanced, pores can be formed in the alumina membrane. The pore can be a uniform pore having a diameter of 10 to 150 μm.

Through the above process (that is, the anodic oxidization principle), a thick alumina membrane having the uniform pores formed therein is formed on the inside wall of the aluminum tube 110. The thickness of the alumina membrane can be about 0.1 to 500 μm as above described.

If the alumina membrane having a sufficient thickness is obtained, the remaining aluminum tube 110 is removed. The aluminum tube 110 can be removed by using an etching method.

Meanwhile, part of the aluminum tube 110 may be left over in order to maintain the mechanical strength of the formed alumina membrane and to use the remaining aluminum tube as a current collector.

Through the above process, the porous aluminum membrane (that is, an inorganic ion conductive membrane) is formed.

As described above, the formed porous inorganic membrane, as in the prior art, may be used in a gas reaction, such purification of an exhaust gas, and as a light absorption layer or an electron acceptor in a solar cell.

A solar cell is operated in such a manner that free electrons generated when absorbed sun light reaches an electron acceptor layer (that is, a p type layer) included in the solar cell continues to be attracted toward an n type layer, thereby generating electric energy. Accordingly, common methods of increasing the efficiency of the solar cell includes a method of improving the absorptivity of light incident on the solar cell and a method of generating lots of free electrons by using absorbed sun light.

If the porous inorganic membrane according to the present invention is applied to a solar cell, not only the absorptivity of light can be increased, but also the generation of free electrons can be accelerated to improve the cell efficiency.

In other words, diffused reflection of incident light is accelerated because of the porous characteristic, and thus the absorptivity of sun light can be increased. Furthermore, if materials of a high photosensitivity are used as the basic materials of the inorganic membrane, the generation of free electrons according to the absorption of sunlight is accelerated, thereby contributing to the improvement of the cell efficiency.

Accordingly, if the inorganic membrane according to the embodiment of the present invention is applied to a solar cell, high light absorptivity and high cell efficiency can be achieved even without an additional element for improving the absorptivity of sun light.

Fuel Cell Using Inorganic Ion Conductive Membrane

Figure 3:
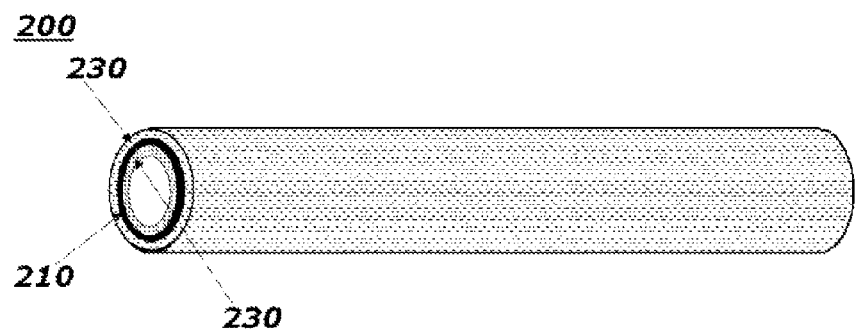
FIG. 3 is a diagram showing some of a structure of a fuel cell including the inorganic ion conductive membrane according to an embodiment of the present invention.

Hereinafter, a method of fabricating a fuel cell by using the inorganic ion conductive membrane obtained according to the above-described method is described with reference to FIG. 3.

First, the inside wall and outside wall of an inorganic ion conductive membrane 210 formed of the alumina membrane is dipped in a noble metal series catalyst mother liquid having activity for a hydrogen dissociation reaction, thereby forming a catalyst layer 230. Here, the inside wall of the inorganic ion conductive membrane 210 is dipped in a catalyst mother liquid, such as a mixture solution of platinum and ruthenium, and the outside wall of the inorganic ion conductive membrane 210 is dipped in a catalyst mother liquid, such as a platinum solution.

According to another embodiment of the present invention, in case where an aluminum plate is used instead of the aluminum tube (that is, in case where the alumina membrane is formed in the form of a plate), the catalyst layer can be formed by dipping both sides of the inorganic ion conductive membrane in a noble metal series catalyst mother liquid.

Next, a crystal structure is grown by performing sintering in a temperature of 450□ under the air flow for 12 hours.

After forming the catalyst layer 230, an organic solution including a sulfonic group is brought in contact with the catalyst layer 230. This is for the purpose of settling the sulfonic group, enabling the conduction of hydrogen ions, in the internal pores of the inorganic ion conductive membrane 210 (that is, the alumina membrane).

Finally, a cathode terminal is formed in the outside wall of a structure 200, including the inorganic ion conductive membrane 210 and the catalyst layer 230, and an anode terminal is formed in the inside wall of the structure 200. Next, hydrocarbon, such as hydrogen or methanol, passes through the inside of the structure, and the outside of the structure is exposed to air or oxygen, thereby completing the fuel cell.

The fuel cell manufactured as described above can be operated even at high temperature without the restriction of temperature because not polymer materials, but the inorganic ion conductive membrane is used. Accordingly, various advantages obtainable at high temperature can be obtained, and the performance of the fuel cell can be maximized.

Furthermore, since the size of a pore (that is, an ion channel) is not changed although temperature changes, a stabilized fuel cell without the leakage of fuels, etc. can be obtained.

Meanwhile, since not polymer materials, but the inorganic ion conductive membrane is used, a fuel which is strong against physical impact and has a high activity may be obtained.

Although the present invention has been described above in connection with specific items, such as detailed elements, limited embodiments, and the drawings, they are provided to help the understanding of the present invention and the present invention is not limited to the above embodiments. Those skilled in the art can modify the present invention in various ways from the above description.

Accordingly, the scope of this document should not be limited to the above-described embodiments, but should be defined within the scope of the appended claims and equivalent thereof.

In accordance with the present invention, not polymer materials, but the inorganic ion conductive membrane is used as the ion conductive membrane of a fuel cell. Accordingly, a fuel cell can be operated even at high temperature without the restriction of temperature, various advantages obtainable at high temperature can be obtained, and the performance of a fuel cell can be maximized.

Furthermore, according to the present invention, the inorganic ion conductive membrane is used as the ion conductive membrane of a fuel cell. Accordingly, a stabilized fuel cell without the leakage of fuels, etc. can be obtained because the size of pores (that is, an ion channel) is not changed although temperature changes.

Meanwhile, the ion conductive membrane of a fuel cell is composed of an inorganic ion conductive membrane without elasticity. Accordingly, a fuel cell which is capable of solving the problem of the existing fuel cell (that is, low reliability according to the existence of elasticity) and strong against physical impact and has a high activity.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of manufacturing a fuel cell, comprising:
    (a) disposing a conductive wire either within a metal tube or at a location spaced apart from a metal plate, the conductive wire and either the metal tube or the metal plate made of the same material, supplying an anode current to the conductive wire, and supplying a cathode current to the metal tube or the metal plate;
    (b) applying an electrolyte to the conductive wire and either the metal tube or the metal plate for forming an inorganic membrane comprising a plurality of pores in either at least a part of an inside wall and outside wall of the metal tube or at least one side of the metal plate to which the cathode current has been supplied and thereby forming an inorganic ion conductive membrane, wherein the electrolyte is a non-polymeric sulfuric acid solution;
    (c) removing at least a part of the metal tube or the metal plate remaining intact after forming the inorganic membrane, by using an etching method; and
    (d) dipping an inside wall and outside wall of the inorganic membrane or both sides of the inorganic membrane in a noble metal series catalyst mother liquid to form a catalyst layer.

2. The method as claimed in claim 1, further comprising (e) settling a sulfonic group, enabling a conduction of hydrogen ions, in the pores of the inorganic membrane by having an organic solution, including a sulfonic group, come in contact with the catalyst layer.

3. The method as claimed in claim 2, further comprising exposing an inside or one side of the inorganic membrane to hydrogen or hydrocarbon and exposing an outside or the other surface of the inorganic membrane to air or oxygen, after the (e).

4. The method as claimed in claim 1, wherein the (d) comprises dipping the inside wall of the inorganic membrane in a mixture catalyst solution of platinum and ruthenium and dipping an outside wall of the inorganic membrane in a platinum solution.

5. The method as claimed in claim 1, wherein the inorganic ion conductive membrane is a non-polymeric inorganic ion conductive membrane.

* * * * *